(12) United States Patent
Hyer et al.

(10) Patent No.: US 8,880,814 B2
(45) Date of Patent: *Nov. 4, 2014

(54) TECHNIQUE TO AVOID CASCADED HOT SPOTTING

(71) Applicant: NetApp, Inc., Sunnyvale, CA (US)

(72) Inventors: Robert W. Hyer, Seven Fields, PA (US); Richard Jernigan, Sewickley, PA (US); Bryan Schmersal, Wexford, PA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/053,933

(22) Filed: Oct. 15, 2013

(65) Prior Publication Data
US 2014/0040548 A1 Feb. 6, 2014

Related U.S. Application Data

(63) Continuation of application No. 13/116,356, filed on May 26, 2011, now Pat. No. 8,560,773, which is a continuation of application No. 11/834,412, filed on Aug. 6, 2007, now Pat. No. 7,975,102.

(51) Int. Cl.
G06F 13/00 (2006.01)
G06F 3/06 (2006.01)

(52) U.S. Cl.
CPC .............. *G06F 3/0689* (2013.01); *G06F 3/067* (2013.01); *G06F 3/0638* (2013.01); *G06F 3/0619* (2013.01); *G06F 3/0665* (2013.01); *G06F 3/0614* (2013.01)
USPC ............................ 711/153; 711/114; 711/159

(58) Field of Classification Search
USPC .......................................... 711/114, 153, 159
See application file for complete search history.

(56) References Cited

U.S. PATENT DOCUMENTS 3,876,978 A 4/1975 Bossen et al.
4,092,732 A 5/1978 Ouchi
(Continued)

FOREIGN PATENT DOCUMENTS

EP 1 324 200 A2 7/2003
WO WO-01/13236 A1 2/2001
WO WO-02/29539 A2 4/2002

OTHER PUBLICATIONS

Anvin, Peter H, "The Mathematics of RAID 6," Dec. 2004.

(Continued)

Primary Examiner — Reba I Elmore
(74) Attorney, Agent, or Firm — Cesari and McKenna, LLP

(57) ABSTRACT

The present invention overcomes the disadvantages of the prior art by providing a technique that stripes data containers across volumes of a striped volume set (SVS) using one of a plurality of different data placement patterns to thereby reduce the possibility of hotspots arising due to each data container using the same data placement pattern within the SVS. The technique is illustratively implemented by calculating a first index value, an intermediate index value and calculating a hash value of an inode associated with a data container to be accessed within the SVS. A final index value is calculated by multiplying the intermediate index value by the hash value, modulo the number of volumes of the SVS. Further, a Locate( ) function may be used to compute the location of data container content in the SVS to which a data access request is directed to ensure consistency of such content.

17 Claims, 11 Drawing Sheets

(56) References Cited

U.S. PATENT DOCUMENTS

| | | |
|---|---|---|
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,547,882 A | 10/1985 | Tanner |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |
| 4,837,680 A | 6/1989 | Crockett et al. |
| 4,847,842 A | 7/1989 | Schilling |
| 4,849,929 A | 7/1989 | Timsit |
| 4,849,974 A | 7/1989 | Schilling et al. |
| 4,849,976 A | 7/1989 | Schilling et al. |
| 4,870,643 A | 9/1989 | Bultman et al. |
| 4,899,342 A | 2/1990 | Potter et al. |
| 4,989,205 A | 1/1991 | Dunphy, Jr. et al. |
| 4,989,206 A | 1/1991 | Dunphy, Jr. et al. |
| 5,077,736 A | 12/1991 | Dunphy, Jr. et al. |
| 5,088,081 A | 2/1992 | Farr |
| 5,101,492 A | 3/1992 | Schultz et al. |
| 5,128,810 A | 7/1992 | Halford |
| 5,148,432 A | 9/1992 | Gordon et al. |
| RE34,100 E | 10/1992 | Hartness |
| 5,163,131 A | 11/1992 | Row et al. |
| 5,166,936 A | 11/1992 | Ewert et al. |
| 5,179,704 A | 1/1993 | Jibbe et al. |
| 5,202,979 A | 4/1993 | Hillis et al. |
| 5,208,813 A | 5/1993 | Stallmo |
| 5,210,860 A | 5/1993 | Pfeffer et al. |
| 5,218,689 A | 6/1993 | Hotle |
| 5,233,618 A | 8/1993 | Glider et al. |
| 5,235,601 A | 8/1993 | Stallmo et al. |
| 5,237,658 A | 8/1993 | Walker et al. |
| 5,257,367 A | 10/1993 | Goodlander et al. |
| 5,271,012 A | 12/1993 | Blaum et al. |
| 5,274,799 A | 12/1993 | Brant et al. |
| 5,305,326 A | 4/1994 | Solomon et al. |
| 5,351,246 A | 9/1994 | Blaum et al. |
| 5,375,128 A | 12/1994 | Menon et al. |
| 5,410,667 A | 4/1995 | Belsan et al. |
| 5,537,567 A | 7/1996 | Galbraith et al. |
| 5,579,475 A | 11/1996 | Blaum et al. |
| 5,623,595 A | 4/1997 | Bailey |
| 5,657,468 A | 8/1997 | Stallmo et al. |
| 5,805,788 A | 9/1998 | Johnson |
| 5,812,753 A | 9/1998 | Chiariotti |
| 5,819,292 A | 10/1998 | Hitz et al. |
| 5,862,158 A | 1/1999 | Baylor et al. |
| 5,884,098 A | 3/1999 | Mason, Jr. |
| 5,948,110 A | 9/1999 | Hitz et al. |
| 5,950,225 A | 9/1999 | Kleiman |
| 5,963,962 A | 10/1999 | Hitz et al. |
| 6,029,168 A | 2/2000 | Frey |
| 6,038,570 A | 3/2000 | Hitz et al. |
| 6,092,215 A | 7/2000 | Hodges et al. |
| 6,138,125 A | 10/2000 | DeMoss |
| 6,138,126 A | 10/2000 | Hitz et al. |
| 6,138,201 A | 10/2000 | Rebalski |
| 6,158,017 A | 12/2000 | Han et al. |
| 6,223,300 B1 | 4/2001 | Gotoh |
| 6,247,157 B1 | 6/2001 | Edirisooriya |
| 6,289,356 B1 | 9/2001 | Hitz et al. |
| 6,502,166 B1 | 12/2002 | Cassidy |
| 6,532,548 B1 | 3/2003 | Hughes |
| 6,557,123 B1 | 4/2003 | Wiencko et al. |
| 6,571,326 B2 | 5/2003 | Spiegel et al. |
| 6,581,135 B2 | 6/2003 | Nakano |
| 6,581,185 B1 | 6/2003 | Hughes |
| 6,671,772 B1 | 12/2003 | Cousins |
| 6,742,137 B1 | 5/2004 | Frey, Jr. |
| 6,779,095 B2 | 8/2004 | Selkirk et al. |
| 6,993,701 B2 | 1/2006 | Corbett et al. |
| 7,073,115 B2 | 7/2006 | English et al. |
| 7,185,144 B2 | 2/2007 | Corbett |
| 7,194,579 B2 | 3/2007 | Robinson |
| 7,203,892 B2 | 4/2007 | Corbett et al. |
| 7,328,305 B2 | 2/2008 | Kleiman et al. |
| 7,366,837 B2 * | 4/2008 | Corbett et al. ............... 711/114 |
| 7,409,625 B2 | 8/2008 | Corbett et al. |
| 7,647,451 B1 * | 1/2010 | Corbett et al. ............... 711/114 |
| 7,975,102 B1 * | 7/2011 | Hyer et al. ................... 711/114 |
| 8,560,773 B1 * | 10/2013 | Hyer et al. ................... 711/114 |
| 2002/0083037 A1 | 6/2002 | Lewis et al. |
| 2002/0116593 A1 | 8/2002 | Kazar et al. |
| 2002/0124137 A1 | 9/2002 | Ulrich et al. |
| 2003/0220985 A1 | 11/2003 | Kawamoto et al. |
| 2005/0132212 A1 | 6/2005 | Haswell |
| 2005/0192932 A1 | 9/2005 | Kazar et al. |
| 2005/0246401 A1 | 11/2005 | Edwards |
| 2006/0184731 A1 * | 8/2006 | Corbett et al. ............... 711/114 |
| 2006/0248379 A1 | 11/2006 | Jernigan, IV |
| 2007/0094529 A1 | 4/2007 | Lango et al. |
| 2007/0101069 A1 | 5/2007 | Corbett et al. |
| 2007/0244908 A1 | 10/2007 | Rajan |

OTHER PUBLICATIONS

Auspex 4Front NS2000, System Architecture, Network-Attached Storage for a New Millennium, Auspex Engineering Technical Report 24, Jan. 1999.
Bestavros, Azer, et al., *Reliability and Performance of Parallel Disks,* Technical Memorandum 45312-891206-01TM, AT&T, Bell Laboratories, Department 45312, Holmdel, NJ, Dec. 1989.
Bitton, Dina, *Disk Shadowing,* Proceedings of the 14th VLDB Conference, LA, CA (1988).
Blaum, Mario, et al., *Evenodd: An Optimal Scheme for Tolerating Double Disk Failures in RAID Architectures,* Computer Architectures News, Association for Computing Machinery, New York, US, vol. 22, No. XP000450355, Apr. 1, 1994.
Blaum, Mario, et al., *Evenodd: An Efficient Scheme for Tolerating Double Disk Failures in RAID Architectures,* IEEE Transactions on Computers, vol. 44, No. 2, Feb. 1995, pp. 192-202.
Bultman, David L., *High Performance SCSI Using Parallel Drive Technology,* In Proc. BUSCON Conf, pp. 40-44, Anaheim, CA, Feb. 1988.
Chen, Peter et al., *Two Papers on RAIDs.* Technical Report, CSD-88-479, Computer Science Division, Electrical Engineering and Computer Sciences, University of California at Berkeley (1988).
Chen, Peter M., et al., *An Evaluation of Redundant Arrays of Disks Using an Amdahl 5890,* Performance Evaluation, pp. 74-85, 1990.
Chen, Peter M.., et al, *Maximizing Performance in a Striped Disk Array,* Proc. 1990 ACM SIGARCH 17th Intern. Symp. on Comp. Arch., Seattle, WA, May 1990, pp. 322-331.
Chen, Peter M., et al., *RAID: High Performance, Reliable Secondary Storage,* ACM Computing Surveys, 26(2):145-185, Jun. 1994.
Chervenak, Ann L., *Performance Measurement of the First RAID Prototype,* Technical Report UCB/CSD 90/574, Computer Science Division (EECS), University of California, Berkeley, May 1990.
Copeland, George, et al., *A Comparison of High-Availability Media Recovery techniques,* in Proc. ACM-SIGMOD Int. Conf. Management of Data, 1989.
Courtright II, William V., et al., *RAIDframe: A Rapid Prototyping Tool for RAID Systems,* Computer Science Technical Report CMU-CS97-142, Carnegie Mellon University, Pittsburgh, PA 15213, Jun. 4, 1997.
Evans *The Tip of the Iceberg:RAMAC Virtual Array—Part I,* Technical Support, Mar. 1997, pp. 1-4.
Gibson, Garth A., et al., *Coding Techniques for Handling Failures in Large Disk Arrays,* Technical Report UCB/CSD 88/477, Computer Science Division, University of California, (Jul. 1988.).
Gibson, Garth A., et al., *Failure Correction Techniques for Large Disk Arrays,* In Proceedings Architectural Support for Programming Languages and Operating Systems, Boston, Apr. 1989, pp. 123-132.

(56) References Cited

OTHER PUBLICATIONS

Gibson, Garth A., et al., *Strategic Directions in Storage I/O Issues in Large-Scale Computing*, ACM Computing Survey, 28(4):779-93, Dec. 1996.
Goldick, Jonathan S., et al., *Multi-resident AFS: An Adventure in Mass Storage*, In Proceedings of the 1995 USENIX Technical Conference, pp. 47-58, Jan. 1995.
Graham, Susan L., et al., *Massive Information Storage, Management, and Use*, (NSF Institutional Infrastructure Proposal), Technical Report No. UCB/CSD 89/493, Jan. 1989.
Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.
Grimes, DW Martinez, *Two Dimensional Parity Error Correction Procedure*, IBM Technical Disclosure Bulletin 2686-2689, Oct. 1982.
Grimes, DW Martinez, *Vertical Parity Generator for Two Dimensional Parity*, IBM Technical Disclosure Bulletin 2682-2685, Oct. 1982.
Hellerstein, Lisa, et al,. *Coding Techniques for Handling Failures in Large Disk Arrays*. In Algorithmica vol. 2, Nr. 3, 182-208 (1994).
Hughes, James, et al., *High Performance RAIT*, Tenth NASA Goddard Conference on Mass Storage Systems and Technologies and Nineteenth IEEE Symposium on Mass Storage Systems, Adelphi, Maryland, USA, Apr. 2002.
Johnson, Theodore, et al, *Tape Group Parity Protection*, IEEE Symposium on Mass Storage, pp. 72-79, Mar. 1999.
Katz, Randy H. et al., *Disk System Architectures for High Performance Computing*, Mar. 1989.
Kent, Jack et al., *Optimizing Shadow Recovery Algorithms*, IEEE Transactions on Software Engineering, 14(2):155-168, Feb. 1988.
Kim, Michelle Y., *Synchronized Disk Interleaving*, IEEE Transactions on Computers, C-35(11):978-988, Nov. 1986.
Kim, Michelle, et al., *Asynchronous Disk Interleaving Approximating Access Delays*, IEEE Transactions on Computers, vol. 40, No. 7, Jul. 1991, pp. 801-810.
Lawlor, F. D., *Efficient Mass Storage Parity Recovery Mechanism*, IBM Technical Disclosure Bulletin 24(2):986-987, Jul. 1981.
Lee, Edward K., et al., *RAID-II: A Scalable Storage Architecture for High-Bandwidth Network File Service*, Technical Report UCB/CSD 92/672, (Feb. 1992).
Lee, Edward K., et al., *The Performance of Parity Placements in Disk Arrays*, IEEE Transactions on Computers, vol. 42 No. 6, Jun. 1993, 14 pages.
Li, Don, et al., *Authors' Reply*, IEEE Transactions on Communications, 46:575, May 1998.
*Limited Distributed DASD Checksum, A RADI Hybrid*, IBW Technical Disclosure Bulletin, IBM Corp. New York, US vol. 35. No. 4A, XP000314813, Sep. 1, 1992.
Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.
Meador, Wes E., *Disk Array Systems*, Proceedings of COMPCON, 1989, pp. 143-146.
Menon, Jai, et al., *Methods for Improved Update Performance of Disk Arrays*, IBM Almaden Research Center, IEEE, Jan. 1992, 10 pages.
Menon, Jai, et al., *Floating Parity and Data Disk Arrays*, Journal of Parallel and Distributed Computing, Boston: Academic Press. Inc., vol. 17 No. 1 and 2, Jan./Feb. 1993, 13 pages.
Microsoft Computer Dictionary, $5^{th}$ Edition, 2002, p. 211.
Ng, Spencer, et al., *Trade-Offs Between Devices and Paths in Achieving Disk Interleaving*, IEEE International Symposium on Computer Architecture, 1988, pp. 196-201.
Ng, Spencer, *Some Design Issues of Disk Arrays*, Proceedings of COMPCON Spring '89, pp. 137-142, IEEE, 1989.
Park, Arvin, et al., *Providing Fault Tolerance in Parallel Secondary Storage Systems*, Technical Report CS-TR-057-86, Princeton, Nov. 1986.
Patel, Arvind M., *Adaptive Cross-Parity (AXP) Code for a High-Density Magnetic Tape Subsystem*, IBM Technical Disclosure Bulletin 29(6):546-562, Nov. 1985.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).
Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.
Storagesuite, *Performance Without Compromise: The Virtual Storage Architecture*, catalogue, 1997.
Reddy, A. L. Narasimha, et al., *An Evaluation of Multiple-Disk I/O Systems*, IEEE Transactions on Computers, vol. 38, No. 12, Dec. 1989, pp. 1680-1690.
Scheuermann, Peter, et al., *Data Partitioning and Load Balancing in Parallel Disk Systems*, The VLDB Journal, vol. 7, Springer-Verlag, Copyright Feb. 1998, 19 pages.
Schulze, Martin E., *Considerations in the Design of a RAID Prototype*, Computer Science Division, Department of Electrical Engineering and Computer Sciences, Univ. of CA, Berkley, Aug. 25, 1988.
Schulze, Martin., et al., *How Reliable is a RAID?*, Proceedings of COMPCON, 1989, pp. 118-123.
Shirriff, Kenneth W., *Sawmill:A Logging File System for a High-Performance RAID Disk Array*, CSD-95-862, Jan. 1995.
Stanek, William R., *Microsoft Windows 2000 Server: Administering Volume Sets and RAID Arrays*, Jan. 10, 2006, (http://www.microsoft.com/technet/prodtechnol/windows2000serv/maintain/operate/11w2kada.mspx), (Printed 1999).
Stodolsky, Daniel, et al., *Parity Logging Overcoming the Small Write Problem in Redundant Disk Array*, School of Computer Science and Department of Electrical and Computer Engineering, Carnegie Mellon University, IEEE, May 1993, 12 pages.
Stonebraker, Michael, et al., *The Design of XPRS*, Proceedings of the $14^{th}$ VLDB Conference, LA, CA (1988).
Tanabe, Takaya, et al, *Redundant Optical Storage System Using DVD-RAM Library*, IEEE Symposium on Mass Storage, pp. 80-87, Mar. 1999.
Tekram—"About RAID 6", Aug. 2004, 3 pages.
Tweten, David, *Hiding Mass Storage Under UNIX: NASA's MSS-H Architecture*, IEEE Symposium on Mass Storage, pp. 140-145, May 1990.
Weikum, Gerhard, et al., *Dynamic File Allocation in Disk Arrays*, ETH Zurich, Department of Computer Science Information Systems—Databases, ACM SIGMOD Record, vol. 20, Issue 2, Jun. 1991, 10 pages.
Wilkes, John, et al., *The HP AutoRAID hierarchical storage system*, ACM Transactions on Computer Systems, Feb. 1996, vol. 14, pp. 108-136.
U.S. Appl. No. 11/272,701 entitled System and Method for Utilizing Sparse Data Containers in a Striped Volume Set filed Dec. 1, 2005 by Peter F. Corbett.
Hartman et al., *The Zebra Striped Network File System*, AMC Transactions on Computer Systems, vol. 13, No. 3, Aug. 1995, 37 pages.
Katz, Randy H. et al., Disk System Architectures for High Performance Computing, Proceedings of the IEEE, vol. 77, No. 12, pp. 1842-1858, Dec. 1989.

\* cited by examiner

TECHNIQUE TO AVOID CASCADED HOT SPOTTING

CROSS-REFERENCE TO RELATED APPLICATIONS

The present application is a continuation of commonly assigned U.S. patent application Ser. No. 13/116,356, which was filed on May 26, 2011, which is a continuation of commonly assigned U.S. patent application Ser. No. 11/834,412, which was filed on Aug. 6, 2007, now issued as U.S. Pat. No. 7,975,102 on Jul. 5, 2011, by Robert Wyckoff Hyer Jr. for a TECHNIQUE TO AVOID CASCADED HOT SPOTTING and is hereby incorporated by reference.

BACKGROUND OF THE INVENTION

1. Field of the Invention

The present invention is directed to storage systems and, in particular to striping a data container across a plurality of volumes on one or more storage systems.

2. Background Information

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the data container. These data blocks are organized within a volume block number (vbn) space that is maintained by the file system. The file system may also assign each data block in the data container a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the is storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system environment or cluster configured to service many clients. Each storage system or node may be configured to service one or more volumes, wherein each volume stores one or more data containers. In one embodiment the volumes serviced by the particular node may be distributed among all of the nodes of the environment. This embodiment distributes the data access requests, along with the processing resources needed to service such requests, among all of the nodes, thereby reducing the individual processing load on each node. In another embodiment, a data container may be striped across a plurality of volumes configured as a striped volume set (SVS), where each volume is serviced by a different node of the cluster, thereby distributing the load for the single data container among a plurality of node. A technique for data container striping is described U.S. Pat. No. 7,698,289, entitled STORAGE SYSTEM ARCHITECTURE FOR STRIPING DATA CONTAINER CONTENT ACROSS VOLUMES OF A CLUSTER, by Michael Kazar, et al, the contents of which are hereby incorporated by reference.

In the latter embodiment described above, each data container is striped across the plurality of volumes using an identical striping (i.e., data placement) pattern. That is, the same data placement pattern is used for each of a plurality of data containers striped across the SVS. Thus, as data is written to data containers, the volumes comprising the SVS are traversed in the same order for each data container. A noted disadvantage of such identical volume traversal arises when a plurality of data containers have continued write operations directed to them. In such situations, one or more nodes servicing the volumes may become unnecessarily overloaded processing the contained write operations, thereby rendering one or more volumes of the SVS a "bottleneck." Eventually, the increasingly bottlenecked volume of the SVS may become a hotspot. As used herein, a hotspot is a localized area to which a significant number of data access requests are directed. System resources may become overloaded while attempting to process the data access requests, resulting in a concomitant loss of throughput. Consequently, because identical striping patterns are used, as the current "bottlenecked" volume completes its I/O (input/output) operations, each subsequent data container will receive the next set of I/O operations directed to the next volume designated by the striping algorithm, thus becoming the new "bottlenecked" volume. In this way, a wave of bottlenecks cascades among the volumes in accordance with the striping algorithm.

SUMMARY OF THE INVENTION

The present invention overcomes the disadvantages of the prior art by providing a technique that stripes data containers across volumes of a striped volume set (SVS) using one of a plurality of different data placement patterns to thereby reduce the possibility of (cascading) hotspots arising due to each data container using the same data placement pattern within the SVS. Illustratively, the SVS is serviced by a storage system architecture that comprises a plurality of nodes interconnected as a cluster. Notably, the novel technique enables more than one data placement pattern to be used to stripe the data containers across the volumes of the SVS, thus facilitating steady servicing of data access requests by the nodes and reducing the effects of hotspots.

Illustratively, the SVS is associated with a set of striping rules that define a particular stripe algorithm, a stripe width and an ordered list of volumes within the SVS. The stripe algorithm specifies the manner in which data container content is apportioned as stripes across the plurality of volumes, while the stripe width specifies the size/width of each stripe. The ordered list of volumes specifies the function and implementation of the various volumes and striping rules of the SVS. For example, the ordering of the volumes in the list may denote the manner of implementing a particular data placement pattern.

Further, a Locate( ) function may be used to compute the location of data container content in the SVS to which a data access request is directed to thereby ensure consistency of such content served by the cluster. Illustratively, the Locate( ) function accepts as an input an inode number of the data container and an offset value indicating an offset into the data container. A first index value is determined by first adding the inode number to the value of the offset divided by the stripe width with the sum then taken modulo the striping table size. Next, an intermediate index value is generated by indexing the first value into the ordered list of volumes. A hash value is then obtained by, for example, indexing, using the inode number, into an array comprising values (numbers) that have been selected to be mutually prime with the size of an ordered list of volumes, which may comprise a striping table. The first index value may then be cached into a configuration table. A final value is determined by multiplying the intermediate index value by the hash value, modulo the number of volumes of the SVS. The final value is then used to identify and locate the volume (and node servicing the volume) by indexing into the stripe table.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention overcomes the disadvantages of the prior art by providing a technique that stripes data containers across volumes of a striped volume set (SVS) using one of a plurality of different data placement patterns to thereby reduce the possibility of hotspots arising due to each data container using the same data placement pattern within the SVS. The technique is illustratively implemented by calculating a first index value, an intermediate index value and then calculating a hash value of an inode associated with a data container to be accessed within the SVS. A final index value is subsequently calculated by multiplying the intermediate index value by the hash value, modulo the number of volumes of the SVS. Further, a Locate( ) function may be used to compute the location of data container content in the SVS to which a data access request is directed to thereby ensure consistency of such content.

A. Cluster Environment

Figure 1:
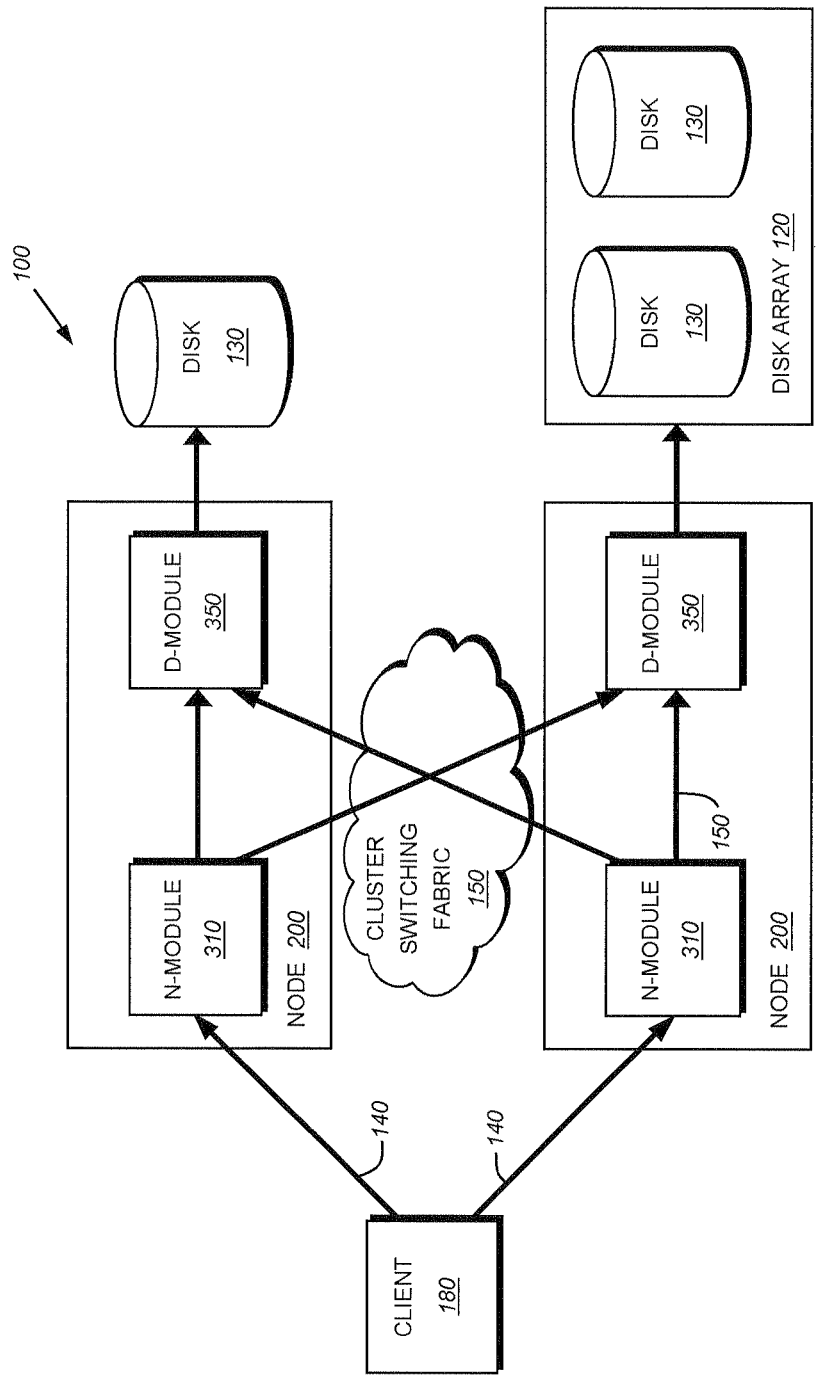
FIG. 1 is a schematic block diagram of a plurality of nodes interconnected as a cluster in accordance with an illustrative embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-Module 310) and a disk element (D-Module 350). The N-Module 310 includes functionality that enables the node 200 to connect to clients 180 over a computer network 140, while each D-Module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002. It should be noted that while there is shown an equal number of N and D-Modules in the illustrative cluster 100, there may be differing numbers of N and/or D-Modules in accordance with various embodiments of the present invention. For example, there may be a plurality of N-Modules and/or D-Modules interconnected in a cluster configuration 100 that does not reflect a one-to-one correspondence between the N and D-Modules. As such, the description of a node 200 comprising one N-Module and one D-Module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

In previous striping systems, such as that described in above-referenced U.S. Pat. No. 7,698,289, data containers are striped using identical algorithms across volumes serviced by the D-Modules. In such systems, a plurality of clients may be accessing sections of data containers that are serviced by a single D-Module. The single D-Module may become inundated with an overwhelming demand for data access requests. Once overloaded, the hotspot may cascade as each data container utilizes the same striping technique. As a result, a concomitant loss of throughput may occur and the hotspot may become exacerbated as more data access operations are received while the rate of data access completion remains stagnant.

B. Storage System Node

Figure 2:
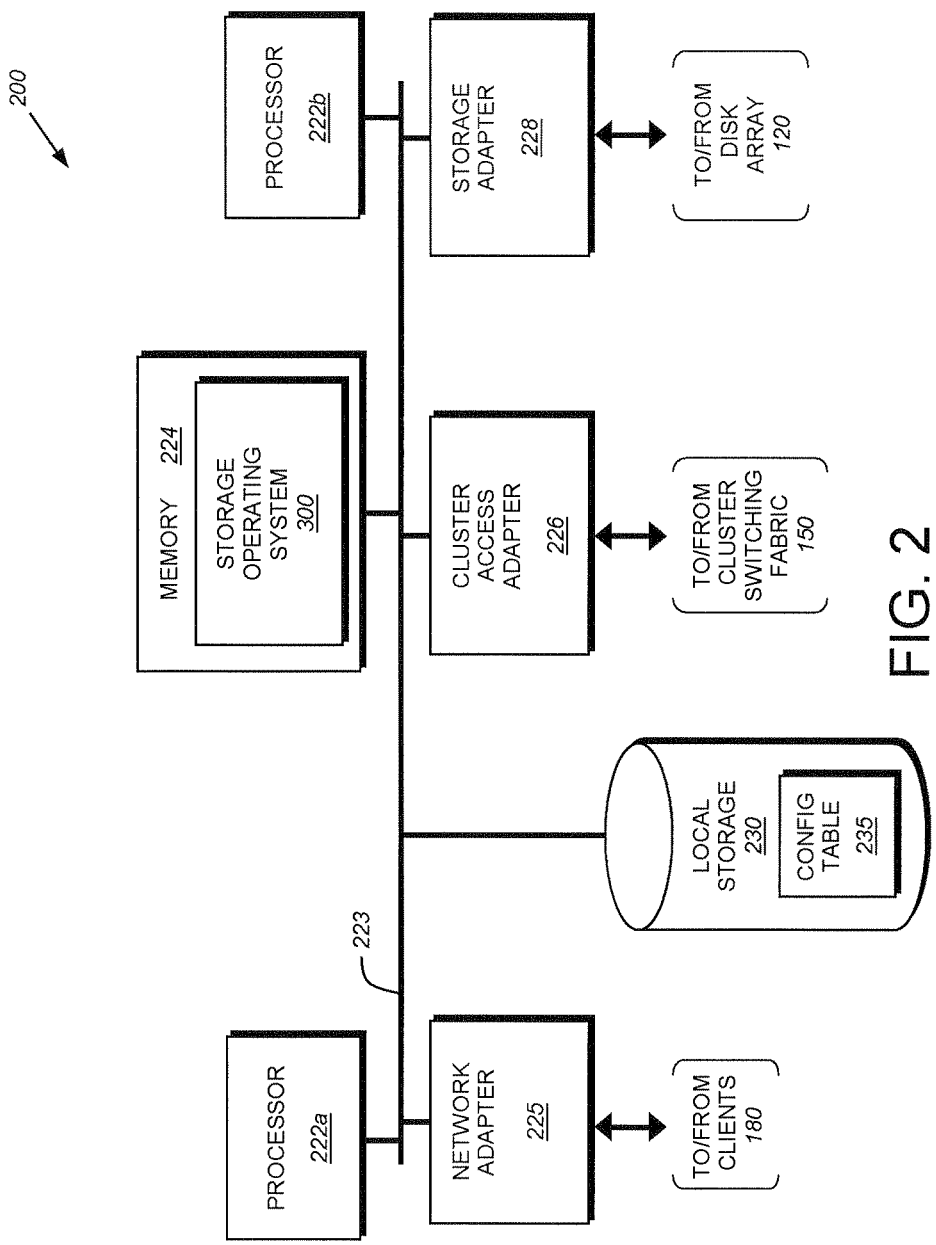
FIG. 2 is a schematic block diagram of a node in accordance with an illustrative embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 700 (see FIG. 7). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-Modules and D-Modules are implemented on separate storage systems or computers, the cluster access adapter 226 is utilized by the N/D-Module for communicating with other N/D-Modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-Module 310 on the node, while the other processor 222b executes the functions of the D-Module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). The volumes may be embodied as flexible volumes and further organized as one or more aggregates. Aggregates and flexible (virtual) volumes are described in U.S. Pat. No. 7,409,494 titled EXTENSION OF WRITE ANYWHERE FILE SYSTEM LAYOUT, by John K. Edwards, et al, and assigned to Network Appliance, Inc., which is hereby incorporated by reference as though fully set forth herein.

As noted above, in previous striping systems, data containers may be striped using identical algorithms across a volume serviced by a single D-Module. As the storage adapter cooperates with the storage operating system executing on the node to access information requested by the clients, the single D-Module may become overwhelmed with demand for data access requests. The present invention overcomes the disadvantages of the previous striping systems by providing a technique that stripes data containers across volumes of a striped volume set (SVS) using one of a plurality of different data placement patterns to thereby reduce the possibility of (cascading) hotspots arising due to each data container using the same data placement pattern within the SVS.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named data containers, such as directories and files on the disks. Each "on-disk" file may be implemented as set of disk blocks configured to store information, such as data, whereas the directory may be implemented as a specially formatted data container in which names and links to other data containers and directories are stored. The virtualization module(s) allow the file system to further logically organize information as a hierarchical structure of data containers, such as blocks on the disks that are exported as named logical unit numbers (luns).

In the illustrative embodiment, the storage operating system is preferably the NetApp® Data ONTAP®operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 3:
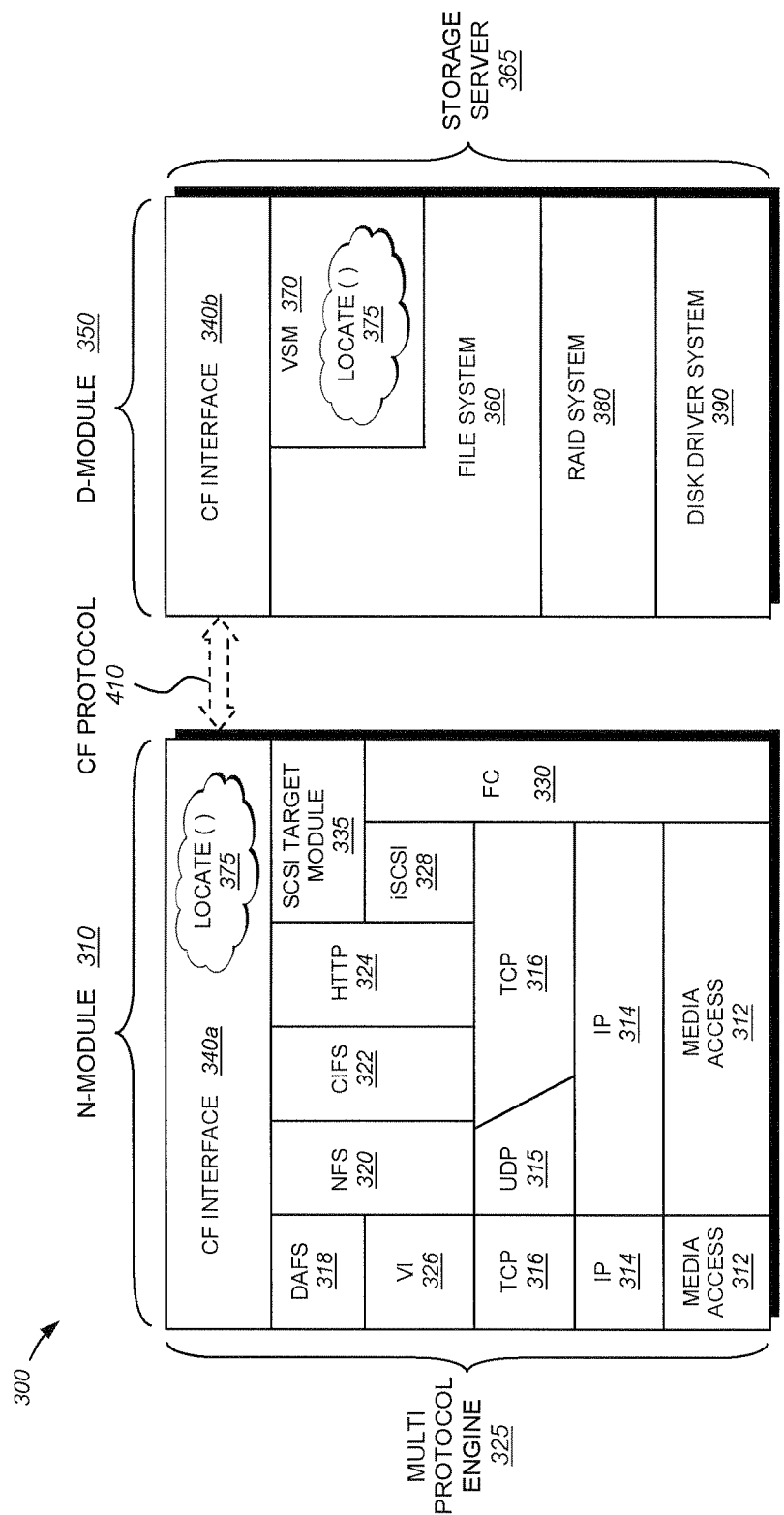
FIG. 3 is a schematic block diagram of a storage operating system that may be used on a node in accordance with an illustrative embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) utilizing the novel data placement technique of the present invention. As described further herein, the VSM cooperates with the file system 360 to enable storage server 365 to service a volume of the SVS. In particular, the VSM 370 implements the novel Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 710 (see FIG. 7), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify data containers and data container attributes (such as creation time, access permissions, size and block location). The file system uses data containers to store meta-data describing the layout of its file system; these meta-data data containers include, among others, an inode data container. A data container handle, i.e., an identifier that includes an inode number (inum), is used to retrieve an inode from disk.

Broadly stated, all inodes of the write-anywhere file system are organized into the inode data container. A file system (fs) info block specifies the layout of information in the file system and includes an inode of a data container that includes all other inodes of the file system. Each logical volume (file system) has an fsinfo block that is preferably stored at a fixed location within, e.g., a RAID group. The inode of the inode data container may directly reference (point to) data blocks of the inode data container or may reference indirect blocks of the inode data container that, in turn, reference data blocks of the inode data container. Within each data block of the inode data container are embedded inodes, each of which may reference indirect blocks that, in turn, reference data blocks of a data container.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode data container using the inode number (inum) to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

The present invention provides a system and method for providing a technique that stripes data containers across volumes of a striped volume set (SVS) using one of a plurality of different data placement patterns to thereby reduce the possibility of (cascading) hotspots arising due to each data container using the same data placement pattern within the SVS.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-Module 350 of the storage operating system 300 to service one or more volumes of array 120. In addition, the multi-protocol engine 325 is embodied as N-Module 310 to (i) perform protocol termination with respect to a client issuing incoming data access request packets over the network 140, as well as (ii) redirect those data access requests to any storage server 365 of the cluster 100. Moreover, the N-Module 310 and D-Module 350 cooperate to provide a highly-scalable, distributed storage system architecture of the cluster 100. To that end, each module includes a cluster fabric (CF) interface module 340a,b adapted to implement intra-cluster communication among the modules, including D-Module-to-D-Module communication for data container striping operations described herein.

The protocol layers, e.g., the NFS/CIFS layers and the iSCSI/FC layers, of the N-Module 310 function as protocol servers that translate file-based and block based data access requests from clients into CF protocol messages used for communication with the D-Module 350. That is, the N-Module servers convert the incoming data access requests into file system primitive operations (commands) that are embedded within CF messages by the CF interface module 340 for transmission to the D-Modules 350 of the cluster 100. Notably, the CF interface modules 340 cooperate to provide a single file system image across all D-Modules 350 in the cluster 100. Thus, any network port of an N-Module that receives a client request can access any data container within the single file system image located on any D-Module 350 of the cluster.

Further to the illustrative embodiment, the N-Module 310 and D-Module 350 are implemented as separately-scheduled processes of storage operating system 300; however, in an alternate embodiment, the modules may be implemented as pieces of code within a single operating system process. Communication between an N-Module and D-Module is thus illustratively effected through the use of message passing between the modules although, in the case of remote communication between an N-Module and D-Module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-Module exposing the CF API to which an N-Module (or another D-Module) issues calls. To that end, the CF interface module 340 is organized as a CF encoder and CF decoder. The CF encoder of, e.g., CF interface 340a on N-Module 310 encapsulates a CF message as (i) a local procedure call (LPC) when communicating a file system command to a D-Module 350 residing on the same node 200 or (ii) a remote procedure call (RPC) when communicating the command to a D-Module residing on a remote node of the cluster 100. In either case, the CF decoder of CF interface 340b on D-Module 350 de-encapsulates the CF message and processes the file system command.

Figure 4:
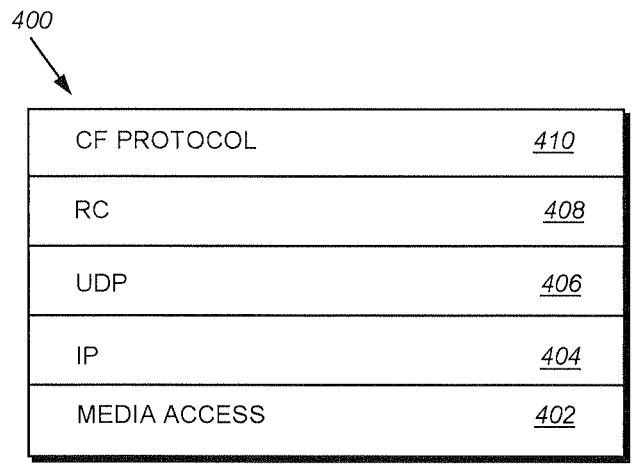
FIG. 4 is a schematic block diagram illustrating the format of a cluster fabric (CF) message in accordance with an illustrative embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-Module 310) to a destination (e.g., a D-Module 350). The RC layer 408 implements a reliable transport protocol that is adapted to process such envelopes in accordance with a connectionless protocol, such as UDP 406.

Figure 5:
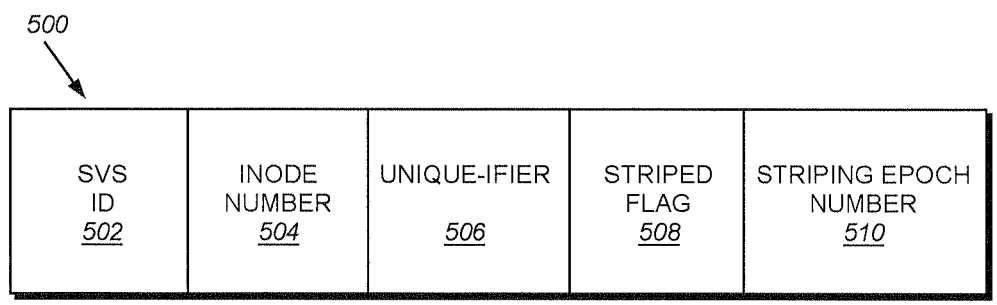
FIG. 5 is a schematic block diagram illustrating the format of a data container handle in accordance with an illustrative embodiment of the present invention.

A data container, e.g., a file, a block, or the like, is accessed in the file system using a data container handle. FIG. 5 is a schematic block diagram illustrating the format of a data container handle 500 including a SVS ID field 502, an inode number (inum) field 504, a unique-ifier field 506, a striped flag field 508 and a striping epoch number field 510. The SVS ID field 502 contains a global identifier (within the cluster 100) of the SVS within which the data container resides. The inode number field 504 contains an inode number of an inode (within an inode data container) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers.

E. File System Organization

Figure 6:
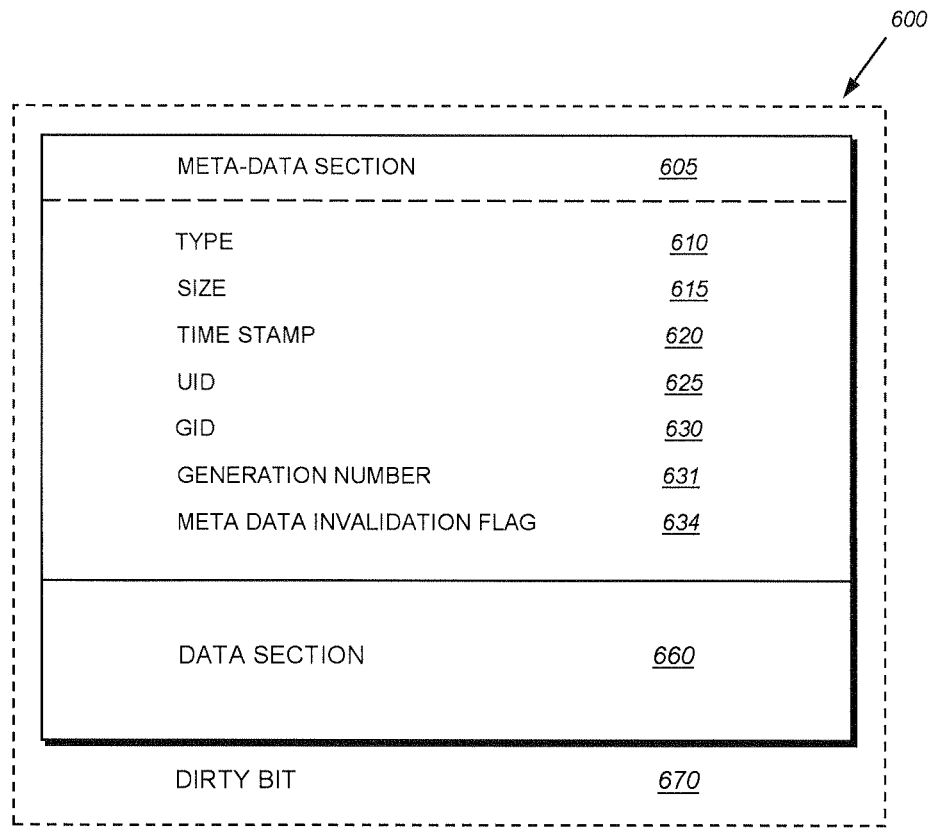
FIG. 6 is a schematic block diagram of an exemplary inode in accordance with an illustrative embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 is of each inode 600 describes the data container (e.g., a file) and, as such, includes the type (e.g., regular, directory, vdisk) 610 of data container, its size 615, time stamps (e.g., access and/or modification time) 620 and ownership, i.e., user identifier (UID 625) and group ID (GID 630), of the data container. The meta-data section 605 also includes a generation number 631, and a meta-data invalidation flag field 634, the latter indicating meta-data whether meta-data in the inode is usable. The contents of the data section 660 of each inode may be interpreted differently depending upon the type of data container (inode) defined within the type field 610. For example, the data section 660 of a directory inode contains meta-data controlled by the file system, whereas the data section of a regular inode contains file system data. In this latter case, the data section 660 includes a representation of the data associated with the data container.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode data container, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

F. VLDB

Figure 7:
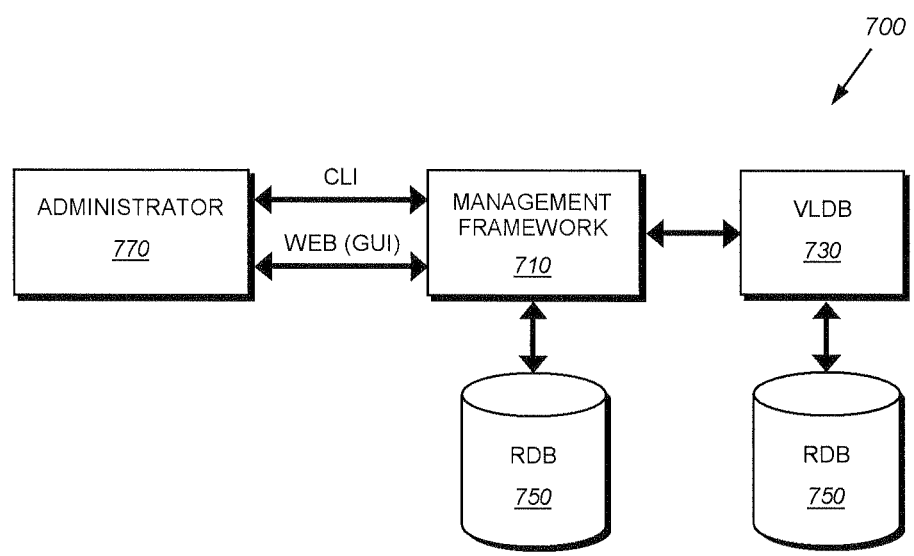
FIG. 7 is a schematic block diagram illustrating a collection of management processes in accordance with an illustrative embodiment of the present invention.

FIG. 7 is a schematic block diagram illustrating a collection of management processes that execute as user mode applications 700 on the storage operating system 300 to provide management of configuration information (i.e. management data) for the nodes of the cluster. To that end, the management processes include a management framework process 710 and a volume location database (VLDB) process 730, each utilizing a data replication service (RDB 750) linked as a library. The management framework 710 provides a user to an administrator 770 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 730 is a database process that tracks the locations of various storage components (e.g., SVSs, flexible volumes, aggregates, etc.) within the cluster 100 to thereby facilitate routing of requests throughout the cluster. In the illustrative embodiment, the N-Module 310 of each node accesses a configuration table 235 that maps the SVS ID 502 of a data container handle 500 to a D-Module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes") and aggregates within the cluster. Examples of such VLDB entries include a VLDB volume entry 800 and a VLDB aggregate entry 900.

Figure 8:
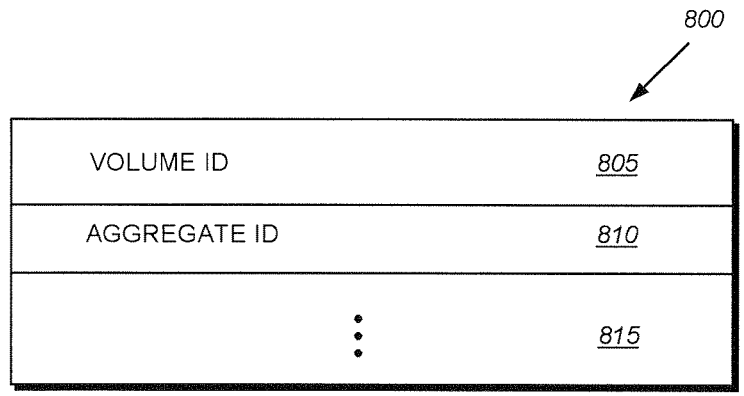
FIG. 8 is a schematic block diagram of a volume location database (VLDB) volume entry in accordance with an illustrative embodiment of the present invention.
Figure 9:
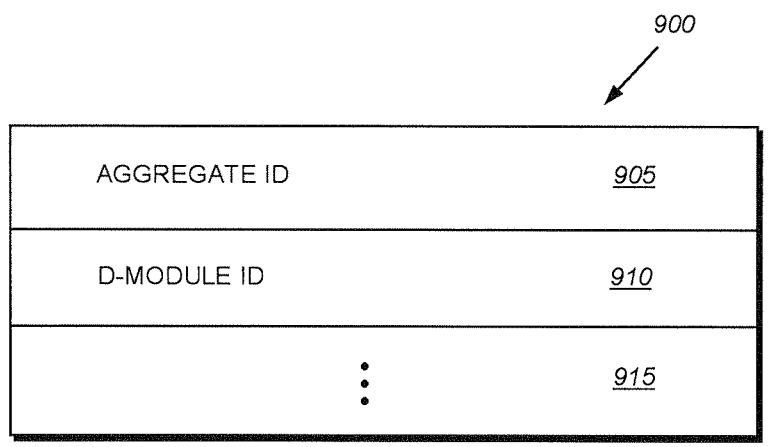
FIG. 9 is a schematic block diagram of a VLDB aggregate entry in accordance with an illustrative embodiment of the present invention.

FIG. 8 is a schematic block diagram of an exemplary VLDB volume entry 800. The entry 800 includes a volume ID field 805, an aggregate ID field 810 and, in alternate embodiments, additional fields 815. The volume ID field 805 contains an ID that identifies a volume used in a volume location process. The aggregate ID field 810 identifies the aggregate containing the volume identified by the volume ID field 805. Likewise, FIG. 9 is a schematic block diagram of an exemplary VLDB aggregate entry 900. The entry 900 includes an aggregate ID field 905, a D-Module ID field 910 and, in alternate embodiments, additional fields 1315. The aggregate ID field 905 contains an ID of a particular aggregate in the cluster 100. The D-Module ID field 910 contains an ID of the D-Module hosting the particular aggregate identified by the aggregate ID field 905.

The VLDB illustratively implements a RPC interface, e.g., a Sun RPC interface, which allows the N-Module 310 to query the VLDB 730. When encountering contents of a data container handle 500 that are not stored in its configuration table, the N-Module sends an RPC to the VLDB process. In response, the VLDB 730 returns to the N-Module the appropriate mapping information, including an ID of the D-Module that owns the data container. The N-Module caches the information in its configuration table 235 and uses the D-Module ID to forward the incoming request to the appropriate data container. All functions and interactions between the N-Module 310 and D-Module 350 are coordinated on a cluster-wide basis through the collection of management processes and the RDB library user mode applications 700.

To that end, the management processes have interfaces to (are closely coupled to) RDB 750. The RDB comprises a library that provides a persistent object store (storing of objects) for the management data processed by the management processes. Notably, the RDB 750 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Data Placement Technique to Avoid Cascaded Hotspots

The present invention overcomes the disadvantages of the prior art by providing a technique that stripes data containers across volumes of a striped volume set (SVS) using one of a plurality of different data placement patterns to thereby reduce the possibility of hotspots arising due to each data container using the same data placement pattern within the SVS. Illustratively, the SVS is serviced by a storage system architecture that comprises a plurality of nodes interconnected as a cluster. Notably, the novel technique enables more than one data placement pattern to be used to stripe the data containers across the volumes of the SVS, thus facilitating steady servicing of data access requests by the nodes and reducing the effects of hotspots.

Illustratively, the SVS is associated with a set of striping rules that define a particular stripe algorithm, a stripe width and an ordered list of volumes within the SVS. The stripe algorithm specifies the manner in which data container content is apportioned as stripes across the plurality of volumes, while the stripe width specifies the size/width of each stripe. The ordered list of volumes specifies the function and implementation of the various volumes and striping rules of the SVS. For example, the ordering of the volumes in the list may denote the manner of implementing a particular data placement pattern.

Further, a Locate( ) function may be used to compute the location of data container content in the SVS to which a data access request is directed to thereby ensure consistency of such content served by the cluster. Illustratively, the Locate( ) function accepts as an input an inode number of the data container and an offset value indicating an offset into the data container. A first index value is determined by first adding the inode number to the value of the offset divided by the stripe width with the sum then taken modulo the striping table size. Next, an intermediate index value is generated by indexing the first value into the ordered list of volumes. A hash value is then obtained by, for example, indexing, using the inode number, into an array comprising values (numbers) that have been selected to be mutually prime with the size of a striping table and with the number of aggregates in the stripe. The first index value may then be cached into a configuration table. A final value is determined by multiplying the intermediate index value by the hash value, modulo the number of volumes of the SVS. The final value is then used to identify and locate the volume (and node servicing the volume) by indexing into the stripe table.

Figure 10:
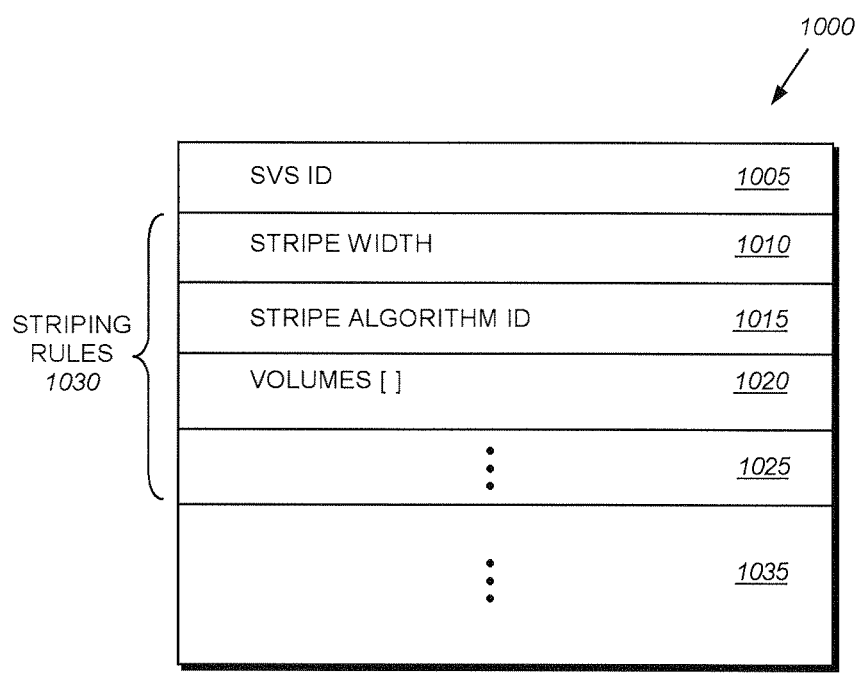
FIG. 10 is a schematic block diagram of a VLDB SVS entry in accordance with an illustrative embodiment the present invention.

FIG. 10 is a schematic block diagram of an exemplary VLDB SVS entry 1000 in accordance with an embodiment of the present invention. The VLDB entry 1000 includes a SVS ID field 1005 and one or more sets of striping rules 1030. In alternate embodiments additional fields 1035 may be included. The SVS ID field 1005 contains the ID of a SVS which, in operation, is specified in data container handle 500.

Each set of striping rules 1030 illustratively includes a stripe width field 1010, a stripe algorithm ID field 1015, an ordered list of volumes field 1020 and, in alternate embodiments, additional fields 1025. The striping rules 1030 contain information for identifying the organization of a SVS. For example, the stripe algorithm ID field 1015 identifies a striping algorithm used with the SVS. In the illustrative embodiment, multiple striping algorithms could be used with a SVS; accordingly, stripe algorithm ID is needed to identify which particular algorithm is utilized. Each striping algorithm, in turn, specifies the manner in which file content is apportioned as stripes across the plurality of volumes of the SVS. In accordance with an illustrative embodiment of the present invention described herein, the novel data placement technique may be identified by one of the multiple stripe algorithm IDs even though the data placement technique utilizes a plurality of data placement patterns. The stripe width field 1010 specifies the size/width of each stripe. The ordered list of volumes field 1020 contains the IDs of the volumes comprising the SVS. In an illustrative embodiment, the ordered list of volumes comprises a plurality of tuples, each comprising a flexible volume ID and the aggregate ID storing the flexible volume. Moreover, the ordered list of volumes may specify the function and implementation of the various volumes and striping rules of the SVS. For example, the ordering of volumes in the list may denote the manner of implementing a particular data placement pattern, e.g., round-robin.

According to yet another aspect of the invention, a Locate( ) function 375 is provided that enables the VSM 370 and other modules (such as those of N-Module 310) to locate a D-Module 350 and its associated volume of a SVS in order to service a data access request to a file. The Locate( ) function takes as arguments, at least (i) a SVS ID 1005, (ii) an offset within the file, (iii) the inode number for the file and (iv) a set of striping rules 1030, and returns the volume on which that offset begins within the SVS. For example, assume a data access request directed to a file is issued by a client 180 and received at the N-Module 310 of a node 200, where it is parsed through the multi-protocol engine 325 to the appropriate protocol server of N-Module 310.

To determine the location of a D-Module 350 to which to transmit a CF message 400, the N-Module 310 may first retrieve a SVS entry 1000 to acquire the striping rules 1030 (and list of volumes 1020) associated with the SVS. The N-Module 310 then executes the Locate( ) function 375 to identify the appropriate volume (and D-Module) to which to direct an operation. Thereafter, the N-Module may retrieve the appropriate VLDB volume entry 800 to identify the aggregate containing the volume and the appropriate VLDB aggregate entry 900 to ultimately identify the appropriate D-Module 350. The protocol server of N-Module 310 then transmits the CF message 400 to the D-Module 350.

Figure 11:
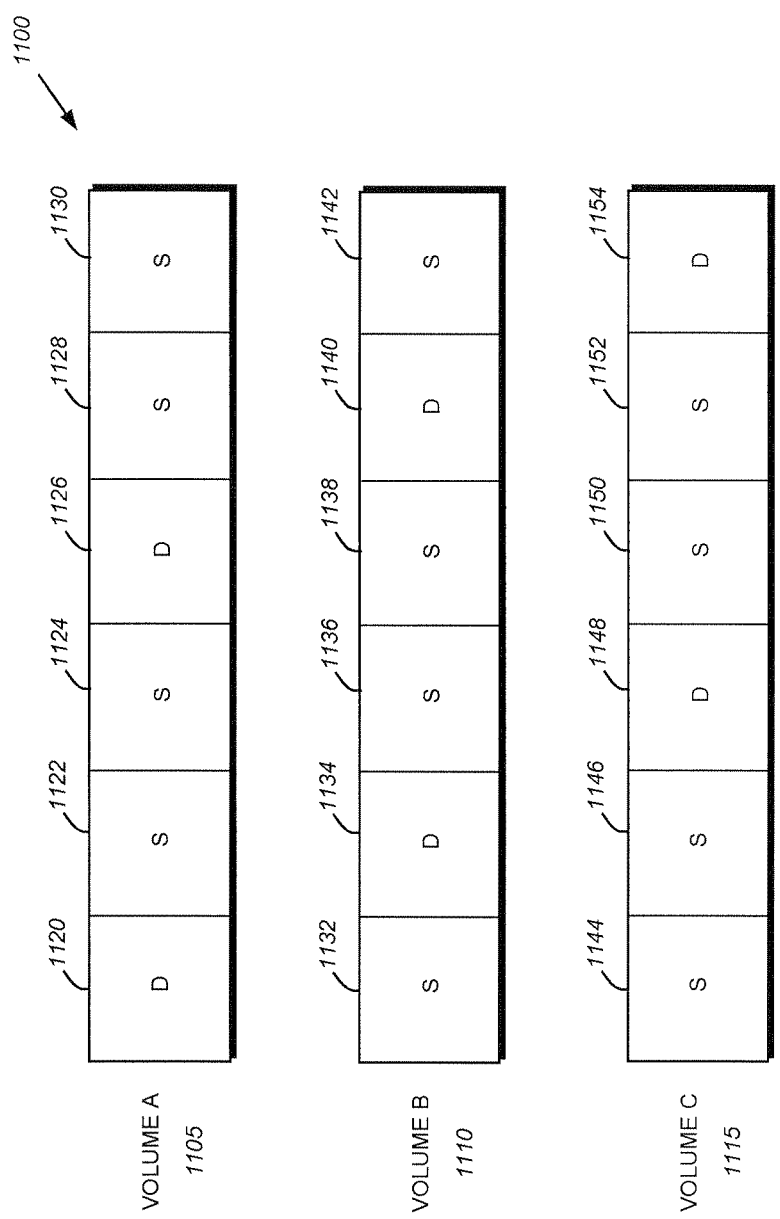
FIG. 11 is a schematic block diagram illustrating the periodic sparseness of data container content stored on volumes of a SVS in accordance with an illustrative embodiment of the present invention.

FIG. 11 is a schematic block diagram illustrating the periodic sparseness of data container content stored on volumes A 1105, B 1110 and C 1115 of SVS 1100 in accordance with an embodiment of the present invention. File content is periodically sparse according to the SVS striping rules, which specify a striping algorithm (as indicated by stripe algorithm ID field 1015) and a size/width of each stripe (as indicated by stripe width field 1010). By sparse, it is meant that one or more regions of the data container are not populated with data. The sparse region may be used to, for example, maintain consistent offset values when committing data from disk to memory. Note that, in the illustrative embodiment, a stripe width is selected to ensure that each stripe may accommodate the actual data referenced by, e.g., an indirect block of a file.

In accordance with an illustrative round robin striping algorithm, volume A 1105 contains a stripe of file content or data (D) 1120 followed, in sequence, by two stripes of sparseness (S) 1122, 1124, another stripe of data (D) 1126 and two stripes of sparseness (S) 1128, 1130. Volume B 1110, on the other hand, contains a stripe of sparseness (S) 1132 followed, in sequence, by a stripe of data (D) 1134, two stripes of sparseness (S) 1136, 1538, another stripe of data (D) 1140 and a stripe of sparseness (S) 1142. Volume C 1115 continues the round robin striping pattern and, to that end, contains two stripes of sparseness (S) 1144, 1146 followed, in sequence, by a stripe of data (D) 1148, two stripes of sparseness (S) 1150, 1152 and another stripe of data (D) 1154. It should be noted that use of the round robin striping technique is only exemplary.

Figure 12:
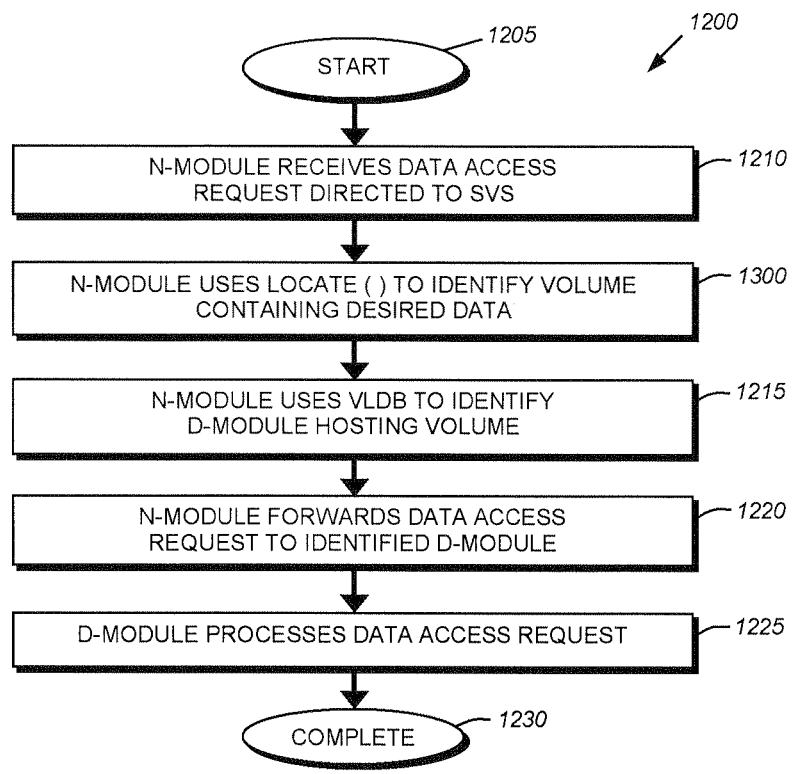
FIG. 12 is a flowchart detailing the steps of a procedure for processing a data access request directed to a data container striped in accordance with an illustrative embodiment of the present invention.

FIG. 12 is a flowchart detailing the steps of a procedure 1200 for processing a data access request directed to a data container within a SVS in accordance with an embodiment of the present invention. The procedure 1200 begins in step 1205 and continues to step 1210 where an N-Module 310 receives a data access request directed to an SVS by, e.g., a client 180 sending the data access request to node 200. In step 1300, described further below in reference to FIG. 13, the N-Module uses a Locate( ) function to identify the volume containing the desired data.

In step 1215, the N-Module accesses the VLDB to identify the D-Module hosting the volume containing the desired data. To determine the location of a D-Module 350 to which to transmit a CF message 400, the N-Module 310 may first retrieve a SVS entry 1000 to acquire the striping rules 1030 (and list of volumes 1020) associated with the SVS. The N-Module 310 then executes a process, such as Locate( ) function 375, to identify the appropriate volume to which to direct the request.

Thereafter, the N-Module 310 may retrieve the appropriate VLDB volume entry 800 to identify the aggregate containing the volume and the appropriate VLDB aggregate entry 900 to ultimately identify the appropriate D-Module 350. Once the N-Module 310 identifies the volume containing the desired data, the procedure proceeds to step 1220 where the N-Module forwards the data access request (via a CF message 400) to the D-Module 350. Upon receiving the data access request, the D-Module processes the data access request in step 1225. The procedure then completes in step 1230.

Figure 13:
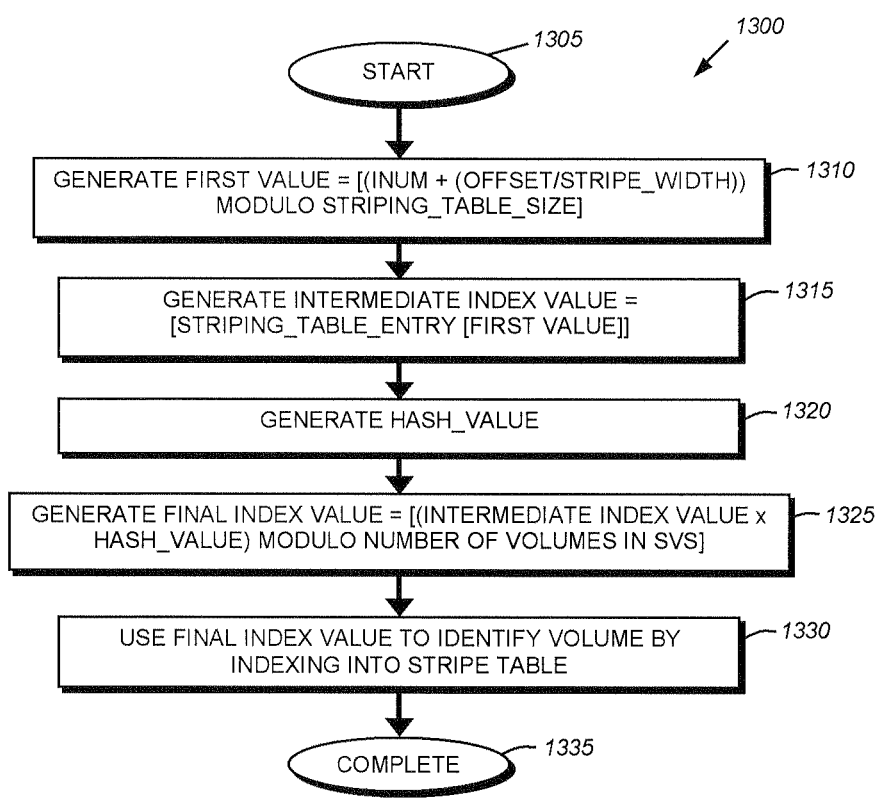
FIG. 13 is a flowchart detailing the steps of a procedure for identifying a location of a volume containing desired data in accordance with an illustrative embodiment of the present invention.

FIG. 13 is a flowchart detailing the steps of a procedure 1300 for identifying a volume of an SVS containing desired data of a data container in accordance with an illustrative embodiment of the present invention. Volume identification may be implemented as a Locate( ) function, as described above. Procedure 1300 begins in step 1305 and continues to step 1310 where a first index value is generated. Illustratively, the Locate( ) function accepts as an input an inode number (inum) of the data container and an offset value or file block number (fbn) within the data container.

The first index value is generated by first adding the inode number to the value of the offset divided by the stripe width with this sum taken modulo the striping table size, e.g.:

First Index Value=[(inum+(offset/stripe_width)) modulo StripingTableSize]

In step 1315, an intermediate index value is generated, e.g.:

Intermediate Index Value=[Striping_Table_Entry[First Index Value]]

In step 1320, a hash value is then generated, for example, by mapping the inode number into numbers that have been selected to be mutually prime with the size of the striping table and with the list of ordered volumes. The N-Module 310 may illustratively cache the first index value in its configuration table 235. In step 1325, the final index value is determined by multiplying the intermediate index value by the hash value, modulo the number of volumes of the SVS, e.g.:

Final Index Value=[(Intermediate Index Value*Hash_Value)Modulo Number of Volumes in SVS]

In step 1330, the final value is then used to identify and locate the volume by indexing into a list of ordered volumes 1020 where the D-Module ID 860 forwards the incoming request to the appropriate data container. The procedure then completes in step 1335.

In another illustrative embodiment, different SVS traversal patterns may be used for separate regions of a single data container. One advantage of this embodiment is that even if a single data container were receiving all the I/O requests, a "bottleneck" could still be avoided. This may be illustratively accomplished by generating a second hash value in step 1320.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed data container systems. Furthermore, while this description has been written in terms of N and D-Modules, the teachings of the present invention are equally suitable to systems where the functionality of the N and D-Modules are implemented in a single system. Alternately, the functions of the N and D-Modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A system for striping a plurality of data containers across a striped volume set, comprising:
   a network element operatively interconnected with a plurality of data elements, the network element having a processor;
   the network element configured to receive data access requests directed to a striped volume set having a plurality of volumes, the network element further configured to:
      execute a locate function to identify a volume of the plurality of volumes that make up the striped volume set using an inode number of an inode associated with a data container and an offset values indicating an offset into the data container striped across the striped volume set, the locate function when executed operable to:

calculate a first value by adding the inode number to the offset value divided by a stripe width modulo a size of a striping table, calculate an intermediate value by indexing the first value into an ordered list of volumes, calculate a first hash value of the inode associated with the data container by indexing, using the inode number, into an array having values that are selected to be mutually prime with a size of the ordered list of volumes, calculate a final value by multiplying the intermediate value by the first hash value modulo a number of volumes of the striped volume set, and index into the striping table using the final value to identify and locate the volume that provides a new location to commence striping the data container across the striped volume set;

use a volume location database to identify a data element hosting the identified and located volume for the data container; and forward the received data access requests to the identified data element for the data container.

2. The system as defined in claim 1 wherein the identified data element is configured to process a first data access request associated with the data container using a first data placement pattern used to stripe the data container across the striped volume set, wherein the first data placement pattern is selected based on the inode number associated with the data container and wherein the identified data element is further configured to process a second data access request associated with a different data container using a different data placement pattern used to stripe the different data container across the striped volume set, wherein the second data placement pattern is based on a different inode number associated with the different data container and wherein the different data placement pattern is different from the first data placement pattern.

3. The system as defined in claim 2 wherein the network element is further configured to associate the striped volume set with at least one striping rule, and the at least one striping rule utilizing the inode number of the data container, and at least one of the offset value into the data container, a number of volumes in the striped volume set and an ordered set of volumes within the striped volume set to generate a second hash value to identify the first data placement pattern.

4. The system as defined in claim 2 wherein the first data placement pattern is used alternately with the different data placement pattern for striping into the data container to reduce hotspots arising due to any of the plurality of data containers using a same data placement pattern.

5. The system as defined in claim 3 wherein the second hash value is further generated using the inode number of the data container to index into a table containing available hash values.

6. The system as defined in claim 5 wherein the inode number and the different inode number are mutually prime.

7. The system as defined in claim 2 wherein the first data placement pattern and the different data placement pattern are selected from a set of data placement patterns.

8. The system as defined in claim 7 wherein the set of data placement patterns contains an equal number of items used by a hash table to identify a selected data placement pattern.

9. The system as defined in claim 2 wherein the data container and the different data container comprise files.

10. The system as defined in claim 1 wherein the striped volume set is associated with a set of striping rules, each of the set of striping rules including a striping algorithm, a stripe width and an ordered list of volumes.

11. A non-transitory computer readable medium containing executable program instructions executed by a processor in a computer network, comprising:

program instructions that configure a network element of each node to receive data access requests directed to a striped volume set having a plurality of volumes, the program instructions further configuring the network element to:

execute a locate function to identify a volume of the plurality of volumes that make up the striped volume set using an inode number of an inode associated with a data container and an offset value into the data container striped across the striped volume set, the program instructions further executing the locate function to:

calculate a first value by adding the inode number to the offset value associated with the data container, divided by a stripe width modulo a size of a striping table, calculate an intermediate value by indexing the first value into an ordered list of volumes, calculate a first hash value of the inode associated with the data container by indexing, using the inode number, into an array having values that are selected to be mutually prime with a size of the ordered list of volumes, calculate a final value by multiplying the intermediate value by the first hash value modulo a number of volumes of the striped volume set, and index into a striping table using the final value to identify and locate the volume that provides a new location to commence striping the first data container across the striped volume set wherein hotspotting is avoided;

use a volume location database to identify a data element hosting the identified and located volume, of the striped volume set, for the data container; and forward the received data access requests to the identified data element for the data container.

12. The non-transitory computer readable medium of claim 11 wherein the program instructions further configure the network element to:

process a first data access request using a first data placement pattern used to stripe the data container across the striped volume set, wherein the first data placement pattern is selected based on the inode number associated with the data container; and process a different data access request using a different data placement pattern used to stripe a different data container across the striped volume set, wherein the second data placement pattern is selected based on a different inode number associated with the different data container, and wherein the different data placement pattern is different form the first data placement pattern so as to avoid hot spotting.

13. The non-transitory computer readable medium of claim 11 wherein the program instructions that configure the network element further comprise:

program instructions that associate the striped volume set with at least one striping rule that utilizes the inode number of the data container, the offset value, a number of volumes in the striped volume set and an ordered set of volumes within the striped volume set to generate a second hash value to identify the first data placement pattern.

14. The non-transitory computer readable medium of claim 11 wherein the striped volume set is associated with a set of striping rules, each of the set of striping rules including a striping algorithm, a stripe width and an ordered list of volumes.

15. A method, comprising:

coupling a network element to a data element, of a node having a processor, that serves data access requests for a striped volume set having a plurality of volumes, the network element configured to associate a first data container with a first data placement pattern, utilized to stripe the first data container across the striped volume set, based on a first inode number associated with the first data container, wherein the striped volume set is associated with a set of striping rules, each of the set of striping rules including a striping algorithm, a stripe width and an ordered list of volumes; and configuring the network element to further associate a second data container with a second data placement pattern, utilized to stripe the second data container across the striped volume set, based on a second inode number associated with the second data container, the second data placement pattern different from the first data placement pattern, wherein the first data placement pattern is used alternately with the second data placement pattern for striping into the first data container to reduce hotspots arising due to each data containers using a same data placement pattern.

16. The method of claim 15 further comprising:

configuring the striped volume set with at least one striping rule from the set of striping rules, the at least one striping rule utilizing the first inode number of the first data container, an offset value into the first data container, a number of volumes in the striped volume set and an ordered set of volumes within the striped volume set to generate a first hash value to identify the first data placement pattern.

17. The method of claim 16 further comprising:

calculating a first value by adding the first inode number to the offset value divided by a stripe width modulo a size of a striping table;

calculating an intermediate value by indexing the first value into an ordered list of volumes;

calculating a second hash value of an inode associated with the first data container by indexing, using the first inode number, into an array having values that are selected to be mutually prime with a size of the ordered list of volumes;

calculating, by the processor, a final value by multiplying the intermediate value by the second hash value modulo the number of volumes in the striped volume set; and indexing into the striping table using the final value to identify and locate a volume that provides a new location to commence striping the first data container across the striped volume set wherein hotspotting is avoided.

* * * * *

UNITED STATES PATENT AND TRADEMARK OFFICE
CERTIFICATE OF CORRECTION

| | | |
|---|---|---|
| PATENT NO. | : 8,880,814 B2 | Page 1 of 1 |
| APPLICATION NO. | : 14/053933 | |
| DATED | : November 4, 2014 | |
| INVENTOR(S) | : Robert W. Hyer et al. | |

It is certified that error appears in the above-identified patent and that said Letters Patent is hereby corrected as shown below:

In the Specification:

Col. 1, line 58 should read:
retrieved (read) from disk into a memory of the storage Col. 11, line 56 should read:
information stored in the meta-data section 605 of each In the Claims:

Claim 1, Col. 17, line 1 should read:
a data container and an offset value indicating an Claim 15, Col. 19, line 29 should read:
hotspots arising due to other data containers using a same Signed and Sealed this
Twenty-fourth Day of March, 2015

Michelle K. Lee
*Director of the United States Patent and Trademark Office*